United States Patent
Chou

(10) Patent No.: US 8,411,436 B2
(45) Date of Patent: Apr. 2, 2013

(54) HEAT SINK ASSEMBLY CONTAINER

(75) Inventor: Chi-Wen Chou, Taipei (TW)

(73) Assignee: Hewlett-Packard Development Company, L.P., Houston, TX (US)

( * ) Notice: Subject to any disclaimer, the term of this patent is extended or adjusted under 35 U.S.C. 154(b) by 218 days.

(21) Appl. No.: 12/912,390

(22) Filed: Oct. 26, 2010

(65) Prior Publication Data

US 2012/0097363 A1 Apr. 26, 2012

(51) Int. Cl.
*H05K 7/20* (2006.01)

(52) U.S. Cl. .......... 361/694; 361/695; 361/679.54; 361/752; 361/725; 206/747

(58) Field of Classification Search .......... 361/704, 361/679.46, 679.54, 694, 695; 174/548
See application file for complete search history.

(56) References Cited

U.S. PATENT DOCUMENTS

| | | | | |
|---|---|---|---|---|
| 4,189,037 A | * | 2/1980 | Szabo | 190/115 |
| 6,276,162 B1 | * | 8/2001 | Schemel | 62/457.2 |
| 7,445,120 B2 | * | 11/2008 | Brej | 206/747 |
| 7,944,697 B2 | * | 5/2011 | Hata et al. | 361/704 |
| 2002/0041484 A1 | * | 4/2002 | Lajara et al. | 361/687 |
| 2008/0062637 A1 | * | 3/2008 | Chang | 361/687 |
| 2009/0279246 A1 | * | 11/2009 | Nguyen et al. | 361/679.34 |
| 2010/0252456 A1 | * | 10/2010 | Cook et al. | 206/162 |
| 2011/0103015 A1 | * | 5/2011 | Hirano et al. | 361/695 |
| 2011/0116233 A1 | * | 5/2011 | Beaudoin et al. | 361/695 |
| 2011/0228477 A1 | * | 9/2011 | Hong | 361/695 |
| 2012/0069514 A1 | * | 3/2012 | Ross | 361/679.33 |

OTHER PUBLICATIONS

Intel® Xeon® Processor Integration overview for boxed Intel® Xeon® Processor-Based systems, http://www.intel.com/support/processors/xeon/sb/cs-007757.htm.

* cited by examiner

*Primary Examiner* — Chau Nguyen
*Assistant Examiner* — Kevin Ahlstrom

(57) ABSTRACT

A heat sink assembly is packaged by placing the heat sink assembly in a container. The container is secured within a hard disk drive cage.

12 Claims, 9 Drawing Sheets

HEAT SINK ASSEMBLY CONTAINER

BACKGROUND

High performing processors for workstation computers often put out a great deal of heat. In order to keep the processors within an operating temperature range, heat sink assemblies can be used. The heat sink assembly can include a motorized fan for more efficient removal of heat from the processor. When a processor manufacturer ships a processor to a systems manufacturer, the heat sink assemblies can be included in a box with the processor and other computer components. The boxed computer components can be shipped within a computer chassis or shipped separately from the computer chassis.

DETAILED DESCRIPTION

A heat sink assembly is packaged in a container and inserted within a hard disk drive cage for shipping. For example, the hard disk drive (HDD) cage with the packaged heat sink assembly is incorporated into a computer chassis. The chassis is, for example, a chassis for a server. Alternatively, the chassis can be for a workstation such as a desktop workstation or a tower workstation.

Figure 1:
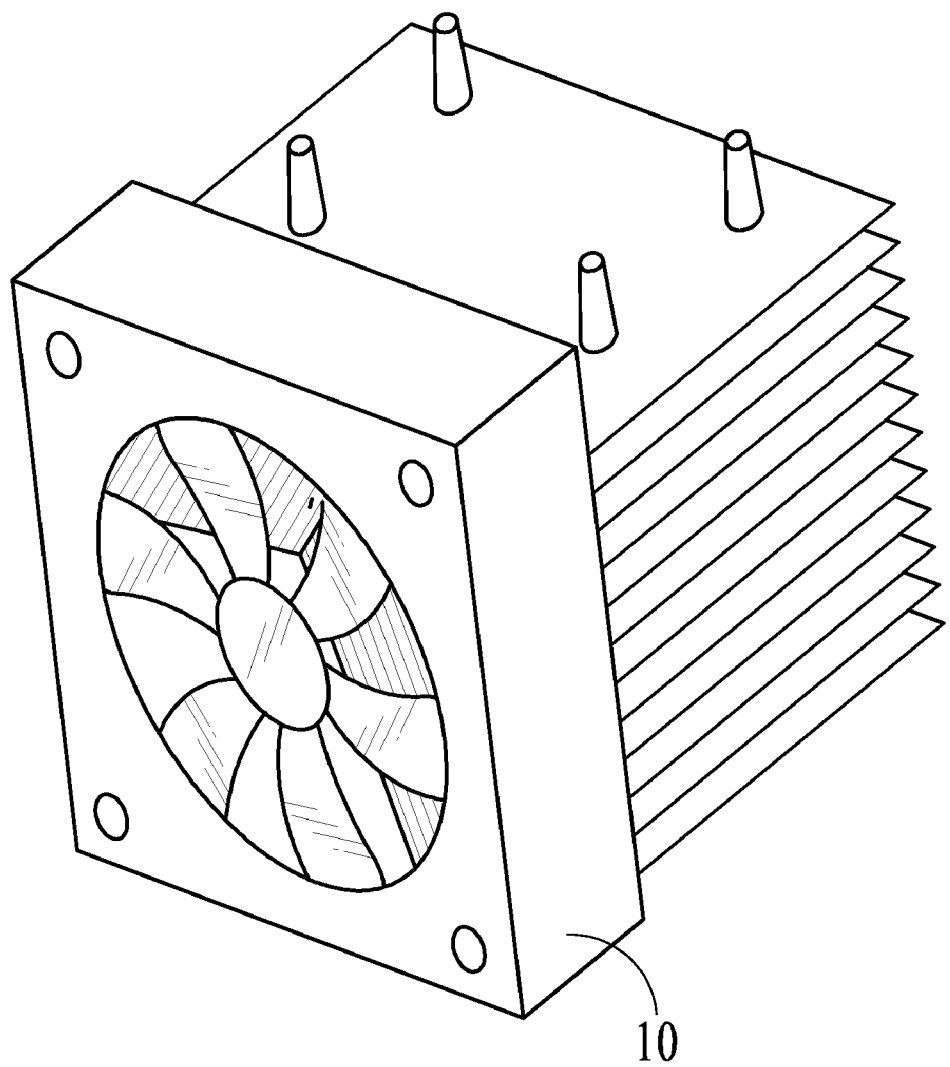
FIG. 1 shows a heat sink assembly in accordance with the prior art.

FIG. 1 shows a typical heat single assembly 10. Heat sink assembly 10 is, for example, a processor heat sink assembly used for a server or workstation similar to a Hewlett-Packard 412095-001 Processor Heat sink Fan Assembly for Workstation Xw6200, w8200.

Figure 2:
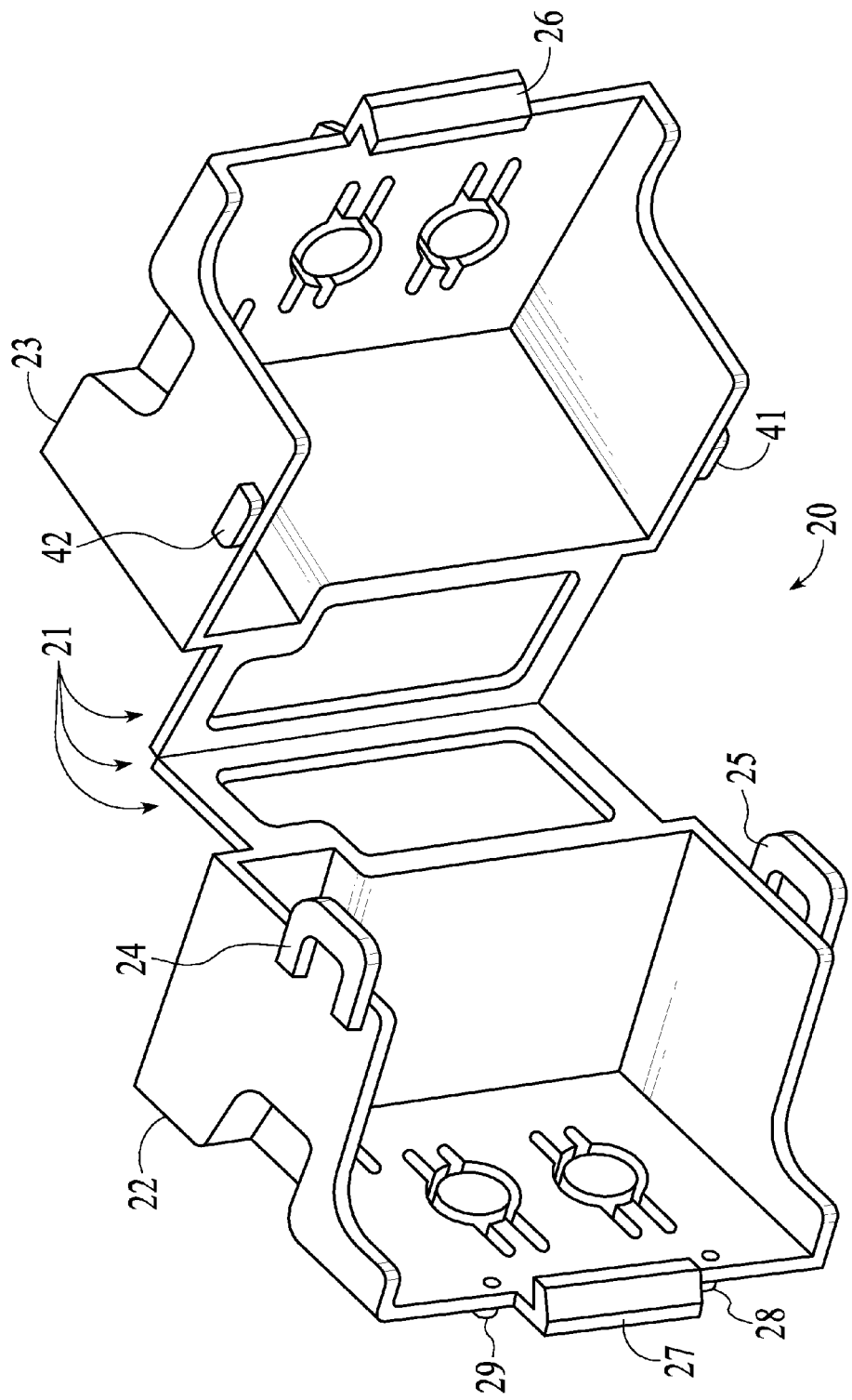
FIG. 2 shows a container for the heat sink assembly shown in FIG. 1 in accordance with an implementation.

FIG. 2 shows a container 20 used to package heat sink assembly 10 shown in FIG. 1. Container 20 has a first container section 22 and a second container section 23 connected by a foldable handle 21. A tab on 26 on second container section 23 and a tab 27 on first container section 22 engage heat sink assembly 10 when heat sink assembly 10 is packaged in container 20. A hook 24 and a hook 25 on first container section 22 are engaged respectively to a tab 42 and a tab 41 to hold first container section 22 securely to second container section 23 when heat sink assembly 10 is packaged in container 20. An appendage 28 and an appendage 29 on second container section 23 are used to secure container 20 within a computer chassis when heat sink assembly 10 is packaged in container 20. For example, container 20 is composed of plastic. Alternatively, container 20 is composed of another cardboard or another rigid or semi-rigid material.

Figure 3:
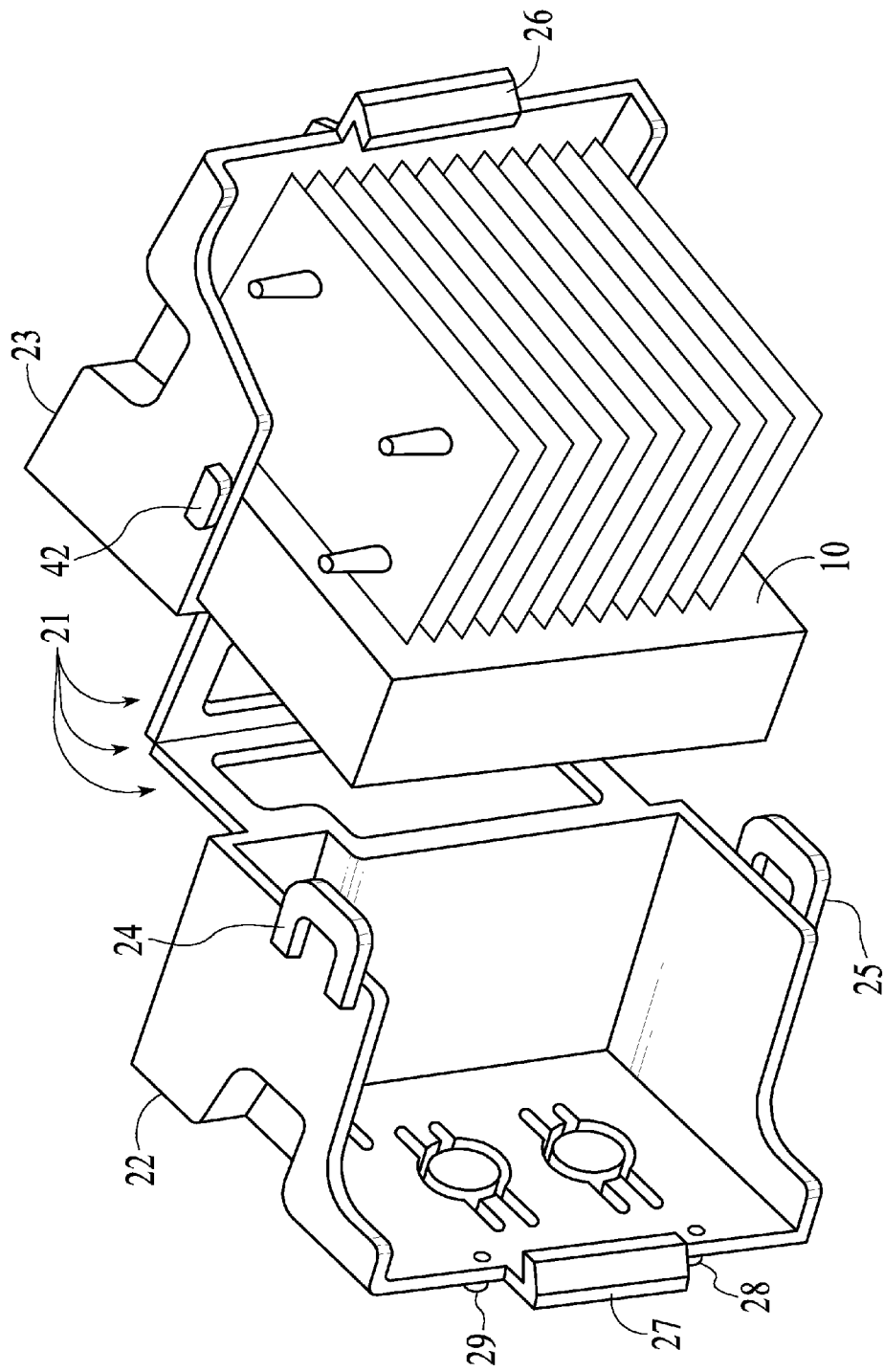
FIG. 3 shows the container in FIG. 2 in the process of being assembled to contain the heat sink assembly shown in FIG. 1 in accordance with an implementation.

FIG. 3 shows container 20 in the process of being assembled to contain heat sink assembly 10. In FIG. 3, heat sink assembly 10 has been placed within second container section 23. To complete the packaging, container 20 will be folded at handle 21 to allow heat sink assembly 10 to also be placed within second container section 22. Hook 24 and hook 25 will then be engaged to corresponding tabs on second container section 23 to hold first container section 22 securely to second container section 23.

Figure 4:
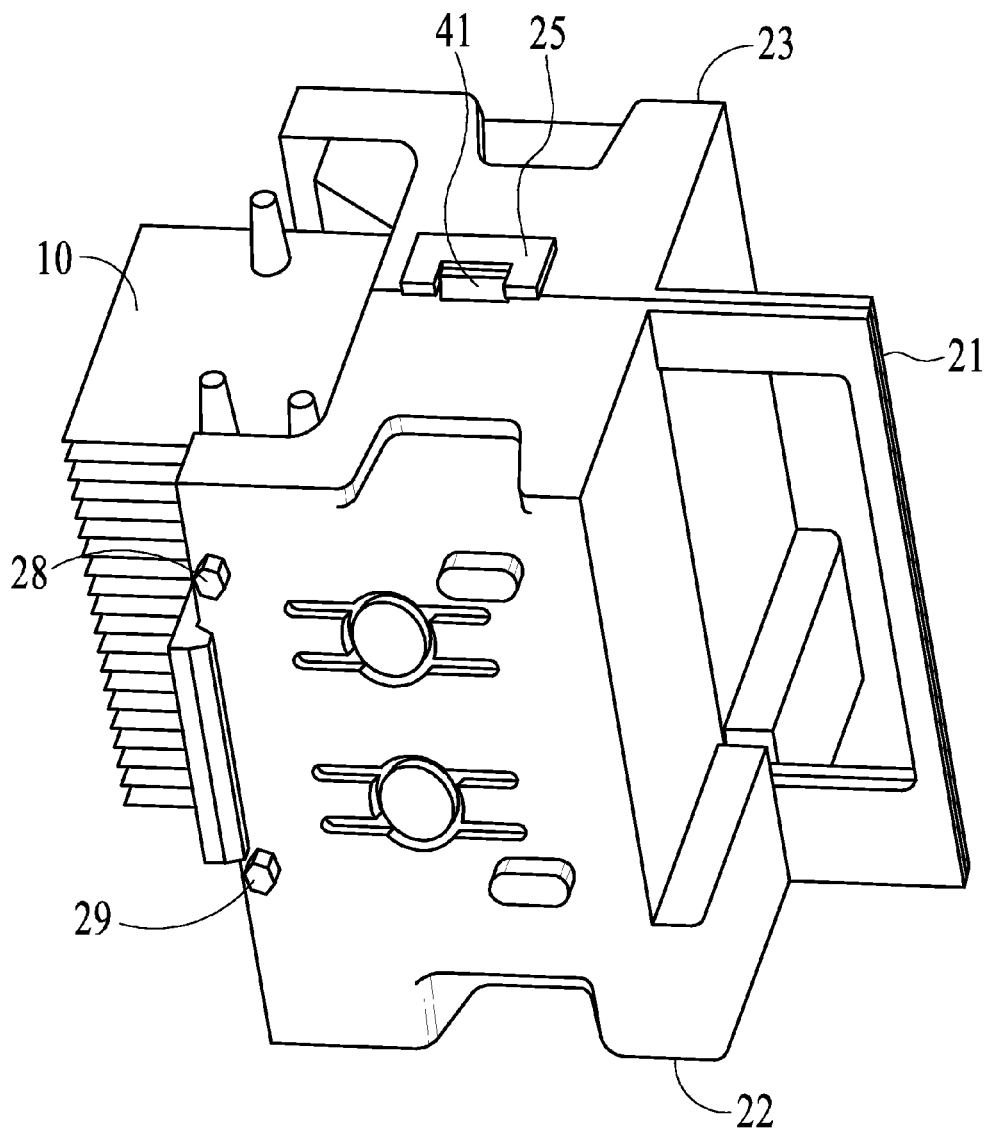
FIG. 4 shows the container in FIG. 2 assembled to contain the heat sink assembly shown in FIG. 1 in accordance with an implementation.

FIG. 4 shows container 20 fully assembled to contain heat sink assembly 10. Hook 25 is shown engaged to corresponding tab 41 to hold first container section 22 securely to second container section 23. Handle 21 provides a convenient way for a user to grip container 20.

Figure 5:
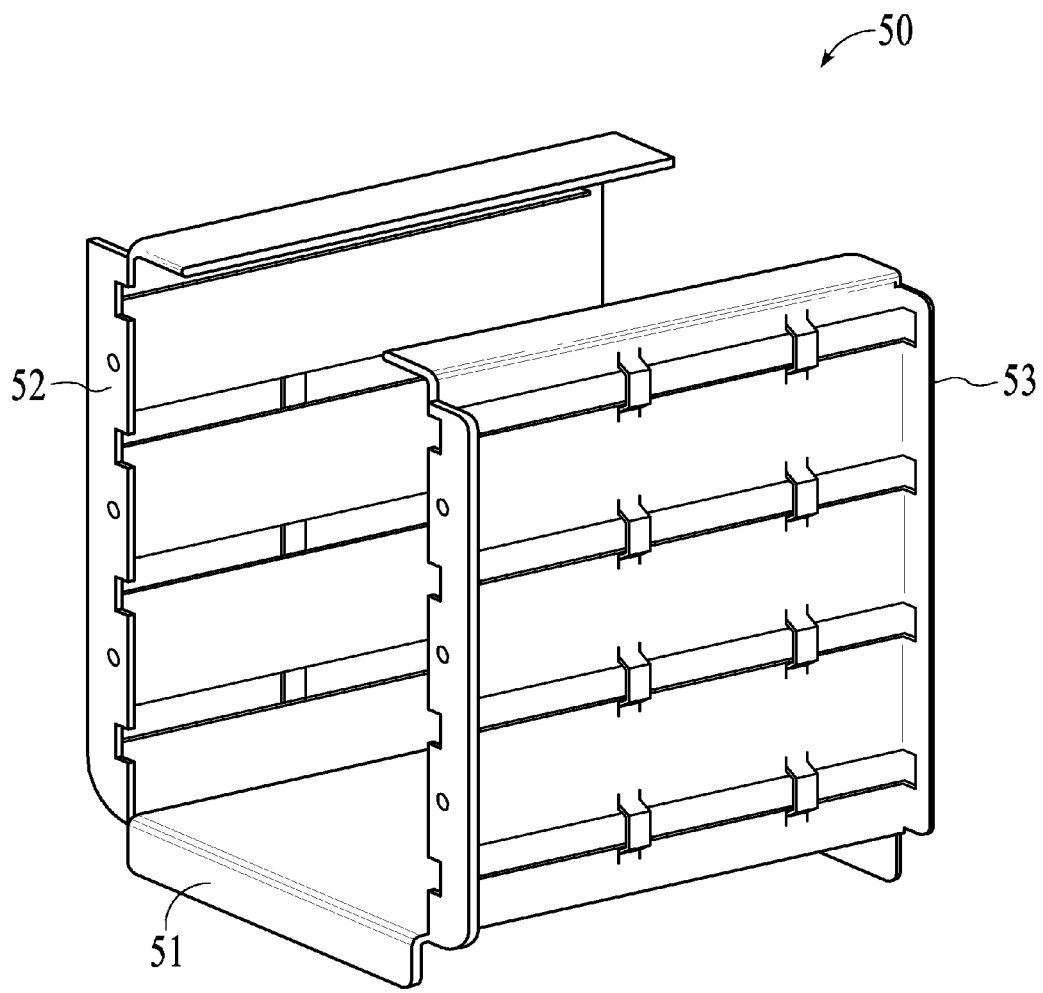
FIG. 5 shows a hard disk drive cage in accordance with the prior art.

FIG. 5 shows a hard disk drive (HDD) cage 50 that forms part of a computer chassis. HDD cage 50 includes a bottom 51, a first side 52 and a second side 53. HDD cage 50 has room to mount four hard disk drives.

Figure 6:
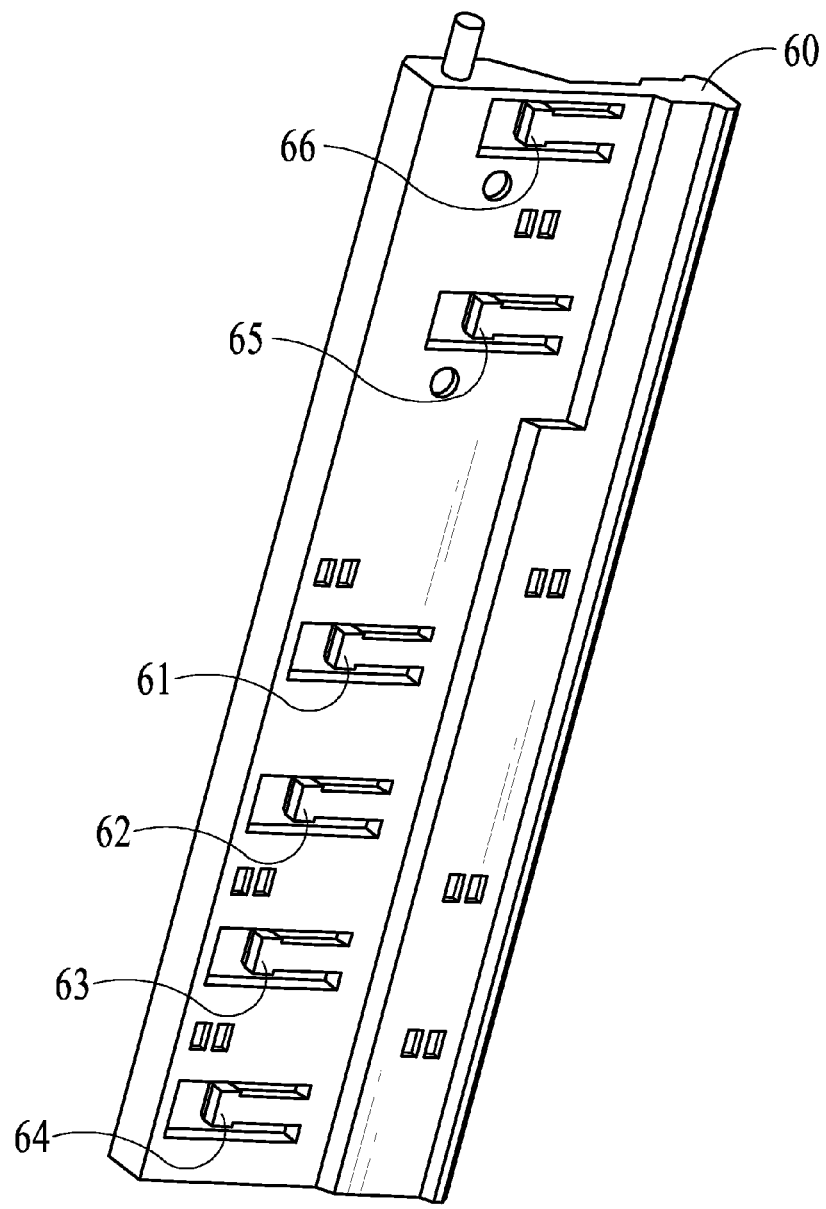
FIG. 6 shows a hard disk drive latch in accordance with the prior art.

FIG. 6 shows a hard disk drive latch 60. Hard disk drive latch includes a latch 61, a latch 62, a latch 63 a latch 64, a latch 65 and a latch 66.

Figure 7:
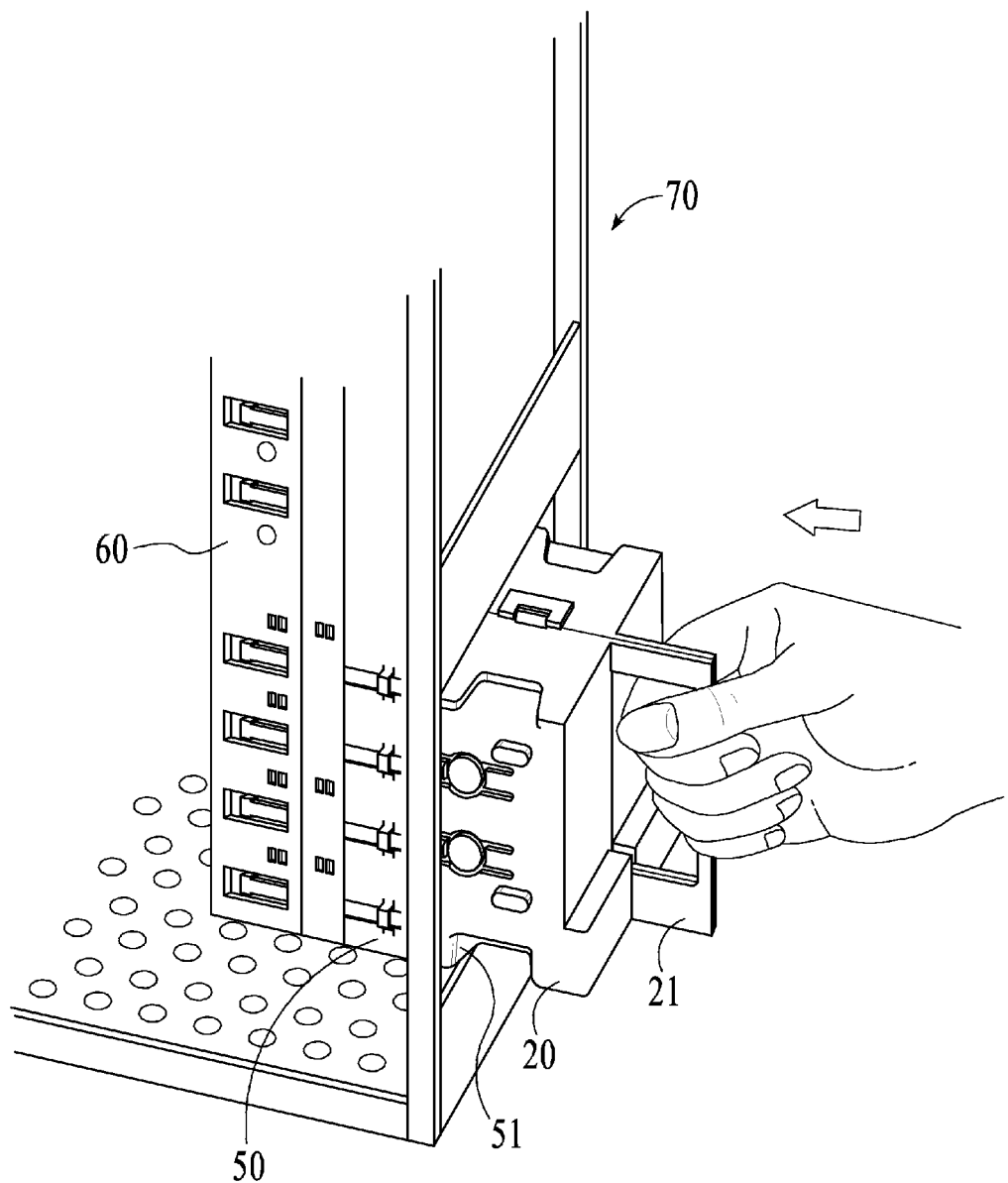
FIG. 7 shows the container in FIG. 2 assembled to contain the heat sink assembly shown in FIG. 1 being placed within the hard disk drive cage shown in FIG. 5 which is shown incorporated as part of a computer chassis in accordance with an implementation.

FIG. 7 shows container 20 assembled to contain heat sink assembly 10 being inserted within hard disk drive cage 50. Hard disk drive latch 60 secures container 20 within hard disk drive cage 50. As shown in FIG. 7, hard disk drive cage 50 can be incorporated as part of a computer chassis 70.

Figure 8:
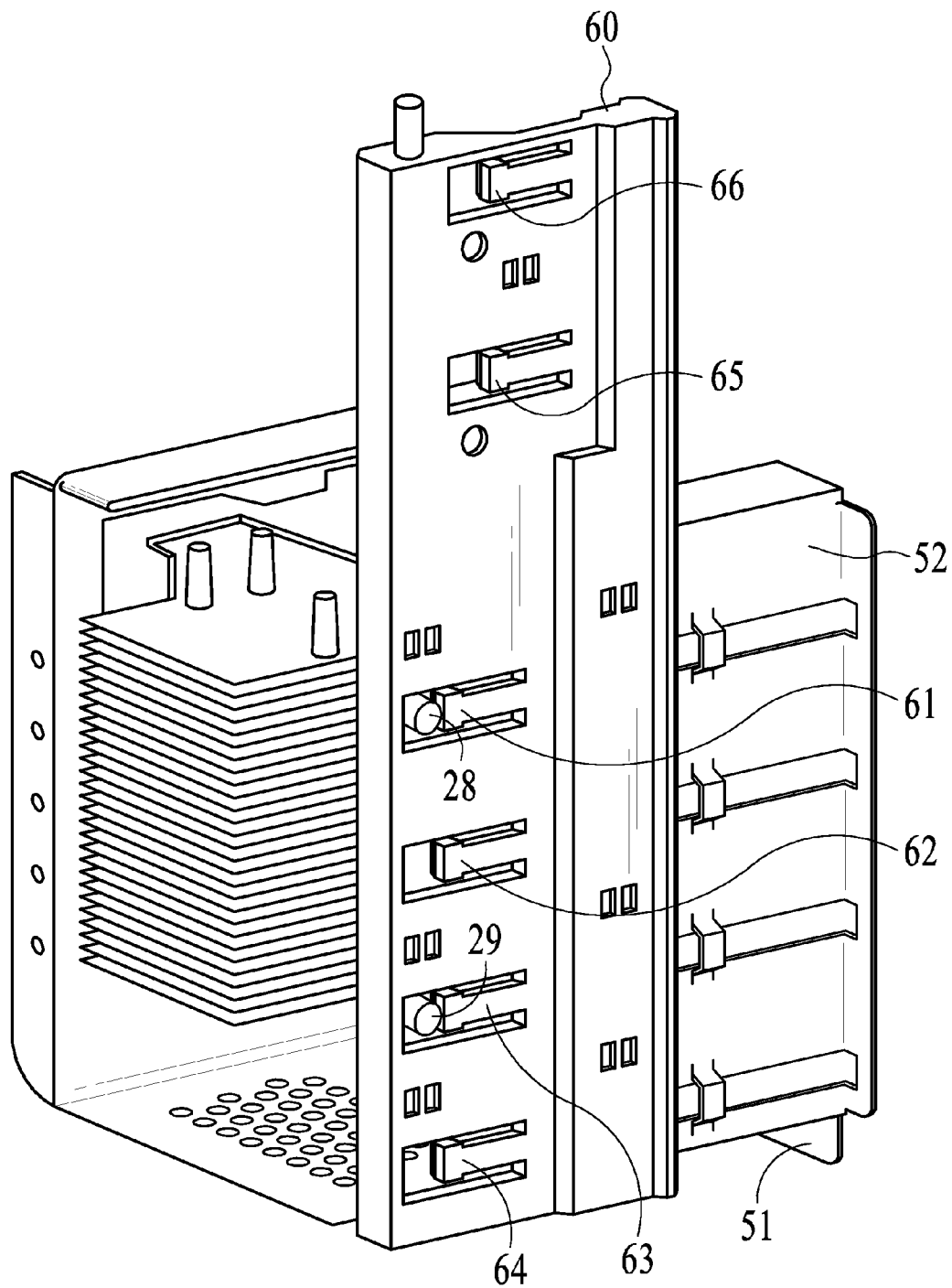
FIG. 8 shows the container in FIG. 2 assembled to contain the heat sink assembly shown in FIG. 1 held within the hard disk drive cage shown in FIG. 5 by the hard disk drive latch shown in FIG. 6 in accordance with an implementation.

As shown by FIG. 8, appendage 28 is held firm within latch 61 and appendage 29 is held firm within latch 63. This secures container 20 within hard disk drive cage 50 during transportation of the computer chassis.

When the computer chassis is at its destination, latch 61 and latch 63 are released allowing a user to use handle 21 to pull container 21 out of hard disk drive cage 50. Hard disk drives can then be mounted within hard disk drive cage 50.

Figure 9:
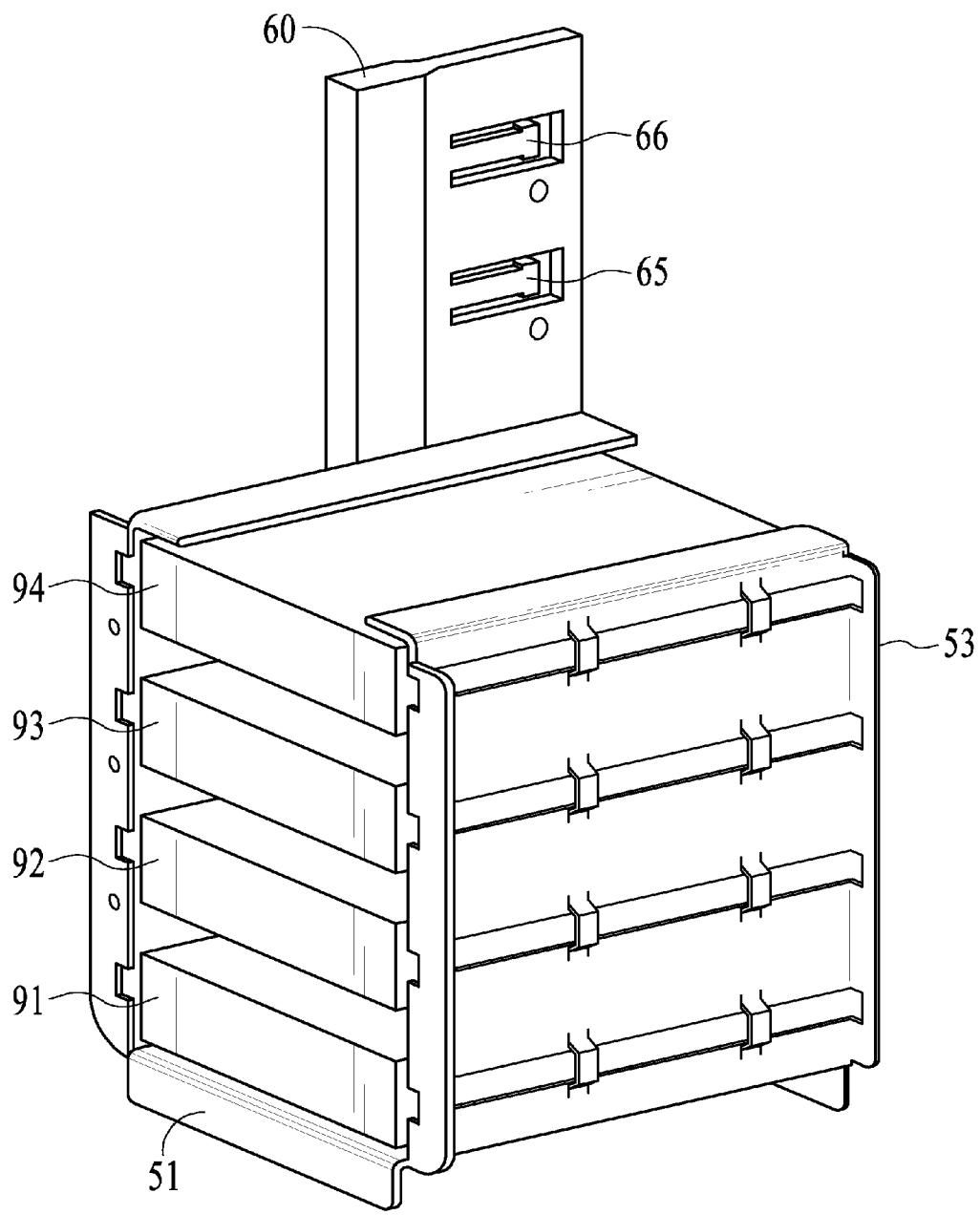
FIG. 9 shows hard disk drives held within the hard disk drive cage shown in FIG. 5 by the hard disk drive latch shown in FIG. 6 in accordance with the prior art.

For example, FIG. 9 shows a hard disk drive 91, a hard disk drive 92, a hard disk drive 93 and a hard disk drive 94 mounted within HDD cage 50 and held in place securely by HDD latch 60.

The foregoing discussion discloses and describes merely exemplary methods and embodiments. As will be understood by those familiar with the art, the disclosed subject matter may be embodied in other specific forms without departing from the spirit or characteristics thereof. Accordingly, the present disclosure is intended to be illustrative, but not limiting, of the scope of the invention, which is set forth in the following claims.

What is claimed is:

1. A method for packaging a heat sink assembly comprising:

placing the heat sink assembly in a container, including folding the container at a handle of the container to bring together a first container section of the container and a second container section of the container so that the heat sink assembly is contained within the first container section and the second container section, wherein the handle includes a first handle section foldable with respect to a second handle section at a foldable handle interface hingedly interconnecting the first handle section and the second handle section, wherein folding the container at the handle includes folding about the foldable handle interface to bring together the first handle section and the second handle section; and,
securing the container within a hard disk drive cage.

2. A method as in claim 1 wherein securing the container within the hard disk drive cage includes using a hard disk drive latch to lock the container within the hard disk drive cage.

3. A method as in claim 1 wherein securing the container within the hard disk drive cage includes using a hard disk drive latch to engage an appendage of the container so as to lock the container within the hard disk drive cage.

4. A method as in claim 1 wherein the hard disk drive cage is incorporated as part of a computer chassis.

5. A method as in claim 1 wherein placing the heat sink assembly in the container includes:
attaching a first container section of the container to a second container section of the container so that the heat sink assembly is contained within the first container section and the second container section.

6. A container for packaging a heat sink assembly, the container comprising:
a first container section;
a second container section having an appendage; and
a folding handle connecting the first container section to the second container section at a foldable handle interface so that when the first container section and the second container section are attached together to package the heat sink assembly, the folding handle provides a hand grip for transporting the container; wherein the handle includes a first handle section foldable with respect to a second handle section at the foldable handle interface hingedly interconnecting the first handle section and the second handle section, wherein the folding handle is foldable about the foldable interface to bring together the first handle section and the second handle section;
wherein the first container section and the second container section are shaped so that when the heat sink assembly is placed within the container, the container fits within a hard disk drive cage so that a hard disk drive latch engages the appendage so as to lock the container within the hard disk drive cage.

7. A container as in claim 6 wherein the hard disk drive cage is incorporated as part of a computer chassis.

8. A container as in claim 6 wherein the second container section also has a second appendage arranged to protrude from the second container section so that the hard disk drive latch engages the second appendage so as to lock the container within the hard disk drive cage.

9. A packaged assembly comprising:
a heat sink assembly;
a container enclosing the heat sink assembly, wherein the container includes a handle that provides a hand grip for transporting the container, wherein the handle includes a first handle section foldable with respect to a second handle section at a foldable handle interface hingedly interconnecting the first handle section and the second handle section, wherein the container is foldable to enclose the heat sink assembly based on folding about the foldable handle interface to bring together the first handle section and the second handle section; and,
a disk drive cage in which the container is enclosed.

10. A packaged assembly as in claim 9 additionally comprising:
a hard disk drive latch that engages an appendage of the container so as to lock the container within the hard disk drive cage.

11. A packaged assembly as in claim 9 additionally comprising:
a hard disk drive latch that engages a plurality of appendages of the container so as to lock the container within the hard disk drive cage.

12. A packaged assembly as in claim 9 wherein the hard disk drive cage is incorporated as part of a computer chassis.

* * * * *